No. 775,292. PATENTED NOV. 22, 1904.
G. ANDRUS.
VERMIN TRAP.
APPLICATION FILED SEPT. 5, 1903.
NO MODEL.

Witnesses:

Inventor
George Andrus
By C. D. Lens
Attorneys

No. 775,292. Patented November 22, 1904.

UNITED STATES PATENT OFFICE.

GEORGE ANDRUS, OF DENORA, PENNSYLVANIA.

VERMIN-TRAP.

SPECIFICATION forming part of Letters Patent No. 775,292, dated November 22, 1904.

Application filed September 5, 1903. Serial No. 172,042. (No model.)

*To all whom it may concern:*

Be it known that I, GEORGE ANDRUS, a citizen of the United States, residing at Denora, in the county of Washington and State of Pennsylvania, have invented a new and useful Improvement in Vermin-Traps, of which improvement the following is a specification.

This invention relates to certain new and useful improvements in vermin-traps, and more particularly to those employed to catch insects and the like; and the object of my invention is to provide a trap which will be comparatively inexpensive to manufacture, simple in construction, and one which will endure continual use.

Another object of my invention is to provide a novel trap which when an insect has once entered the trap it will be impossible for the insect to exit in any part of the trap.

A further object of my invention is to provide a trap which can be readily attached to any piece of furniture or placed in any position where insects exist; and a still further object is the novel manner in which the trap may be emptied when once filled.

With the above and other objects in view reference will be had to accompanying drawings, wherein like numerals of reference indicate like parts throughout the several views, in which—

Figure 1:
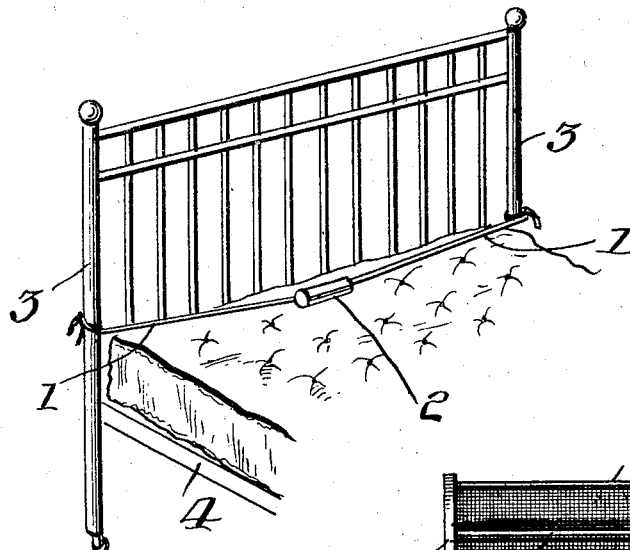
Figure 2:
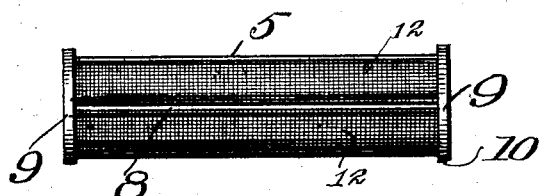
Figure 3:
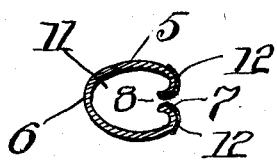
Figure 4:
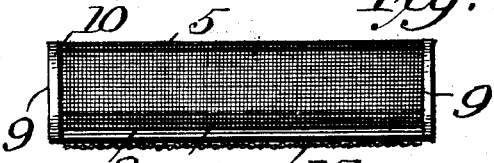
Figure 5:
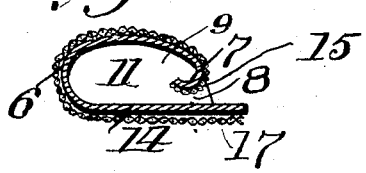

Figure 1 is a view showing the trap applied to a piece of furniture. Fig. 2 is a front view of the trap. Fig. 3 is a section thereof; Fig. 4, a modified form of trap illustrated in front elevation; Fig. 5, a section of the same.

In the accompanying drawings I have shown in Fig. 1 the trap as applied to a bedstead, which we will assume is infested with bedbugs, and when so used I employ straps 1, which are secured to the trap 2 in any suitable manner. The other ends of strap 1 are adapted to be fastened to the posts 3 of the bed 4, whereby the trap 2 will be held in any desired position. The trap 2 is made of any suitable material, preferably celluloid, and in constructing the trap I employ a piece of celluloid 5, which is bent into an elliptical form 6, the sides again being bent or curved inwardly, as at 7, forming an elongated slot 8. To close the ends, I employ the plates 9, which are flanged, as indicated at 10, these plates being adapted to support and rigidly hold the body portion of the trap. By this construction it will be seen that when an insect once enters the elliptical compartment 11 it will be impossible for the insect to leave said compartment on account of the smooth and glassy surface of the celluloid, and to assist the insects to enter the trap I preferably employ a piece of cloth 12 upon each side of the slot 8, whereby the insects may readily crawl into the trap.

Figs. 4 and 5 are illustrated modified forms of traps which may be employed. In Figs. 4 and 5 the trap is formed similar to the first construction, except one side of the compartment 11 is flat, as shown at 14, and the entrance-slot 15 is in alinement therewith.

The traps may be covered entirely with a fabric, as indicated at 17 in Fig. 5, if the maker so desires. However, this is optional.

While I have herein shown and described my invention in the form I preferably employ, yet I do not care to limit myself, as various changes may be made without departing from the general spirit and scope of the invention.

What I claim, and desire to secure by Letters Patent, is—

As an article of manufacture, an insect-trap comprising a strip of material having a highly-glazed surface bent in elliptical form and provided with a slot along one side, an inwardly-curved flange along the slot, flanged end plates secured to the body, fabric upon the outside of said body, and securing-straps projecting beyond the said end plates, substantially as described.

In testimony whereof I have hereunto signed my name in the presence of two subscribing witnesses.

GEORGE ANDRUS.

In presence of—
GEO. W. ALLEN,
MINNIE CULP.